United States Patent [19]

Verdin et al.

[11] Patent Number: 4,797,325
[45] Date of Patent: Jan. 10, 1989

[54] SPACECRAFT MATERIALS

[75] Inventors: Derek Verdin, Wantage; Michael J. Duck, Didcot, both of England

[73] Assignee: United Kingdom Atomic Energy Authority, London, England

[21] Appl. No.: 807,465

[22] Filed: Dec. 10, 1985

[30] Foreign Application Priority Data

Dec. 13, 1984 [GB] United Kingdom ............... 8431518

[51] Int. Cl.$^4$ ................. B32B 27/00; B05D 3/02; B64C 1/00
[52] U.S. Cl. ................... 428/473.5; 428/263; 428/379; 428/409; 428/472.15; 428/689; 427/38; 427/122; 427/385.5; 244/1 A; 244/117 A; 244/158 A
[58] Field of Search .............. 244/158 A, 117 A, 1 A; 427/38, 122, 385.5, 386, 387, 393.1, 394; 428/263, 379, 409, 473.5, 689, 472.1

[56] References Cited

U.S. PATENT DOCUMENTS

| | | | |
|---|---|---|---|
| 3,984,730 | 10/1976 | Hunter | 344/1 A |
| 4,084,985 | 4/1978 | Evans, Jr. | 136/898 |
| 4,111,851 | 9/1978 | Shai | 252/518 |
| 4,199,650 | 4/1980 | Mirtich et al. | 428/421 |
| 4,329,731 | 5/1982 | Meulenberg, Jr. | 361/218 |
| 4,363,834 | 12/1982 | Verzwyvelt | 427/296 |
| 4,468,432 | 8/1984 | Matsukura et al. | 428/328 |
| 4,489,906 | 12/1984 | Fellas | 244/15 BA |
| 4,531,691 | 7/1985 | Boulay et al. | 244/1 A |
| 4,534,998 | 8/1985 | DuPont et al. | 427/122 |
| 4,560,577 | 12/1985 | Mirtich et al. | 428/446 |
| 4,584,280 | 4/1986 | Nanao et al. | 501/80 |
| 4,664,980 | 5/1987 | Sovey et al. | 428/421 |

Primary Examiner—John E. Kittle
Assistant Examiner—P. J. Ryan
Attorney, Agent, or Firm—William R. Hinds

[57] ABSTRACT

A method of manufacturing a dielectric material for use in spacecraft, comprising the operation of coating a dielectric substrate with a layer comprising a metal oxide dispersed in a solution of a polymer material of a thickness such that when the polymer solvent has evaporated the resultant layer has a thickness comparable with the expected maximum range of incident electrons.

19 Claims, 3 Drawing Sheets

SURFACE RESISTIVITY AS A FUNCTION OF THE FILM THICKNESS AND THE LOADING RATIO

ELECTROSTATIC PERFORMANCE OF $In_2O_3$-LOADED COATINGS ON KAPTON UNDER ELECTRON IRRADIATION

SPACECRAFT MATERIALS

The present invention relates to dielectric materials for use in spacecraft.

The exposed surfaces of dielectric materials on spacecraft (especially satellites in geosynchronous orbit) become electrically charged due to bombardment with high fluxes of electrons of up to about 30 keV energy during geomagnetic sub-storms. The surface of the material acquires a voltage as a result of electrons being trapped just below it, and subsequent dielectric breakdown to underlying or adjacent conductive materials can cause electromagnetic interference with satellite control and communication systems, and can physically damage the dielectric.

Two methods of overcoming the above problems have been described in the literature for the case of Kapton, a polyimide material widely used in satellite construction.

The first (see, for example; F. Levadou, S. J. Bosma and A. Paillous, Spacecraft Charging 1980, NASA Conference Publication 2182, AFGL-TR-81-0270 p237 et seq) employs a thin (~0.01 μm) coating of indium-tin oxide (ITO) applied by vacuum deposition. The surface voltage of Kapton treated in this way remains close to zero when irradiated at −180° C. with electrons of up to 30 keV energy. However, the material has the following disadvantages:

(a) During handling, and possibly as a consequence of the vibration during launching of the satellite, cracks may be formed in the coating, which will impair its electrical properties;
(b) The material must be prefabricated as flat sheet;
(c) The material is expensive to manufacture.

The principal of the second type of material (see; C. N. Fellas, Spacecraft Charging Technology 1980, NASA Conference Publication 2182, AFGL-TR-81-0270) is to place a charge collector in the form of a conductive layer at a depth inside the dielectric which is close to the average range of the incident electrons. The material takes the form of a laminate, comprising a thin layer of plain Kapton (~7 μm thick), a thin layer of conductive material below this, an adhesive layer, and finally a thicker substrate layer (~50 μm thick plain Kapton). Three versions of the material have been developed using different conductive layers and adhesives. When irradiated at −180° C. with electrons of up to 30 keV energy these materials attained surface voltages of up to 2.3 kV, but they did not exhibit any significant discharge activity. Materials of this type have not yet been used on a satellite, and they have the following disadvantages:

(a) Under some conditions the surface voltage rises above zero and may reach 2.3 kV;
(b) Deterioration of the adhesives at high radiation doses may limit the long term stability of the laminate.

According to the present invention there is provided a method of manufacturing a dielectric material for use in spacecraft, comprising the operation of coating a dielectric substrate with a layer comprising a metal oxide finely dispersed in a solvent solution of a polymer material of a thickness such that when the polymer solvent has evaporated the resultant layer is semi-insulating and has a thickness comparable with the expected maximum range of incident electrons in use.

Also according to the present invention there is provided a dielectric material for use in a spacecraft, comprising a dielectric substrate having deposited on a surface thereof a semi-insulating layer consisting of a dispersion of a metal oxide in a polymer, the thickness of the layer being comparable to the expected maximum range of electrons to which the dielectric material will be exposed in use.

Typically the dielectric substrate may comprise an exposed surface of a spacecraft component.

The invention will now be described, by way of example, with reference to the accompanying drawings, in which.

A dielectric material which often is used in spacecraft is that known by the name Kapton H; (manufactured by Du Pont de Nemours Inc., USA), a polymer which has been identified is a soluble polyimide known as type XU-218, manufactured by Ciba-Geigy Corp., USA, and one of a number of appropriate solvents is a mixture of xylene and acetophenone. Metal oxides which can be used have volume resistivities less than about 1Ω . m at the temperature and in the radiation field in which the material is employed; they include, indium oxide, indium-tin oxide, and thallium oxide.

The nature and proportion of metal oxide in the coating layer and its thickness are chosen to have values such that the surface resistivity of the material ensures that the voltage acquired by the dielectric material during use does not exceed about 200 volts. For thin layers of the coating material the thermo-optical properties (solar absorptance $\alpha_s$ and emittance $\epsilon$) are close to those of the original material ($\alpha_s/\epsilon = 0.57$ for Kapton). For example, indium oxide or zinc oxide in layers of soluble polyimide of between 2 to 4 μm thickness and with metal oxide/polymer ratios of about 3:1 by weight have been found to give values of $\alpha_s/\epsilon$ in the region of 0.65. Coatings have been prepared with various indium oxide/polyimide ratios up to 12:1 and film thicknesses up to 5 μm, and have been found to have values of the ratio $\alpha_s/\epsilon$ in the range 0.65 to 0.80. However, if a material with an improved electrostatic performance is desired, and values of $\alpha_s/\epsilon$ of about unity are required, then thallium oxide can be used, since a coating comprising a 2 μm thick layer of thallium oxide/soluble polyimide had a surface resistivity of $1.8 \times 10^7$ ohm/square and a value of $\beta_s/\epsilon$ of 0.97.

Figure 1:
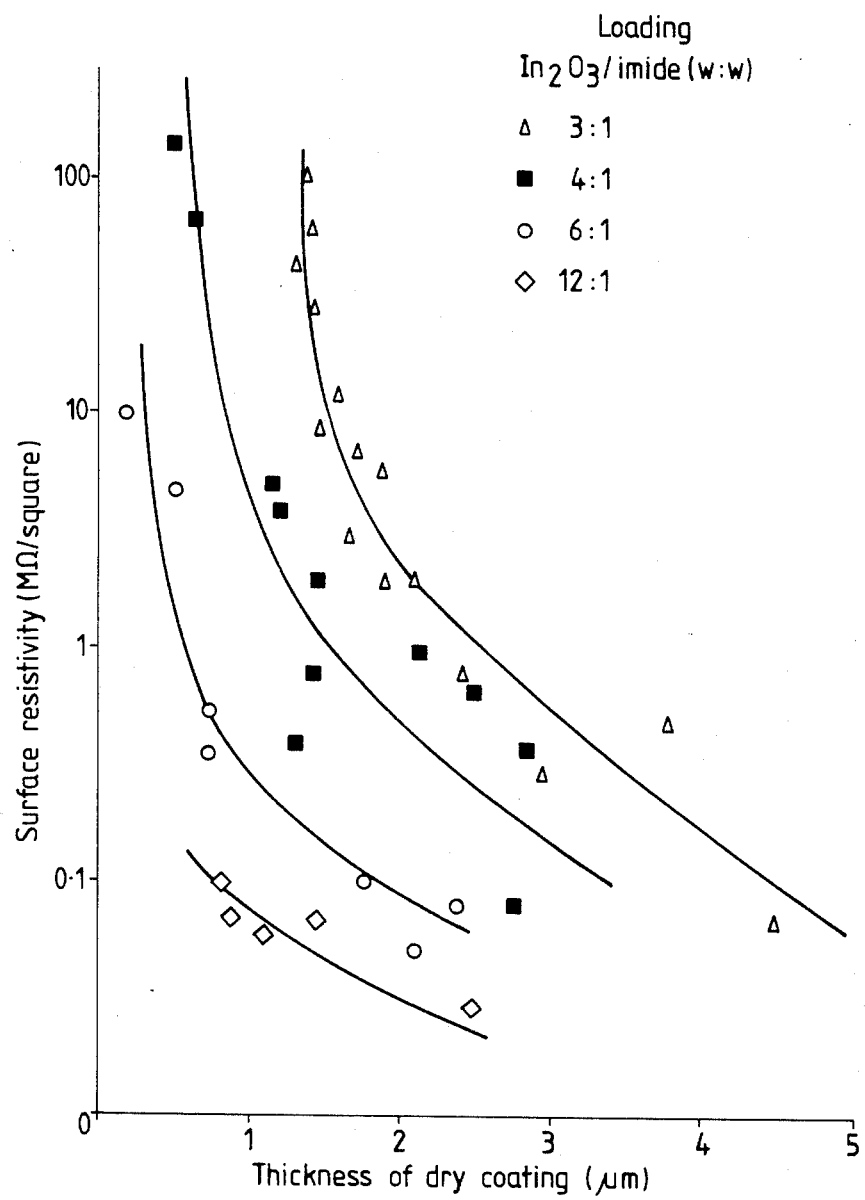
FIG. 1 shows graphically the surface resistivity of a body of dielectric material having a surface layer according to the invention as a function of the thickness of the surface layer and the proportion by weight of the metal oxide in the polymer forming the surface layer on the dielectric material.
Figure 2:
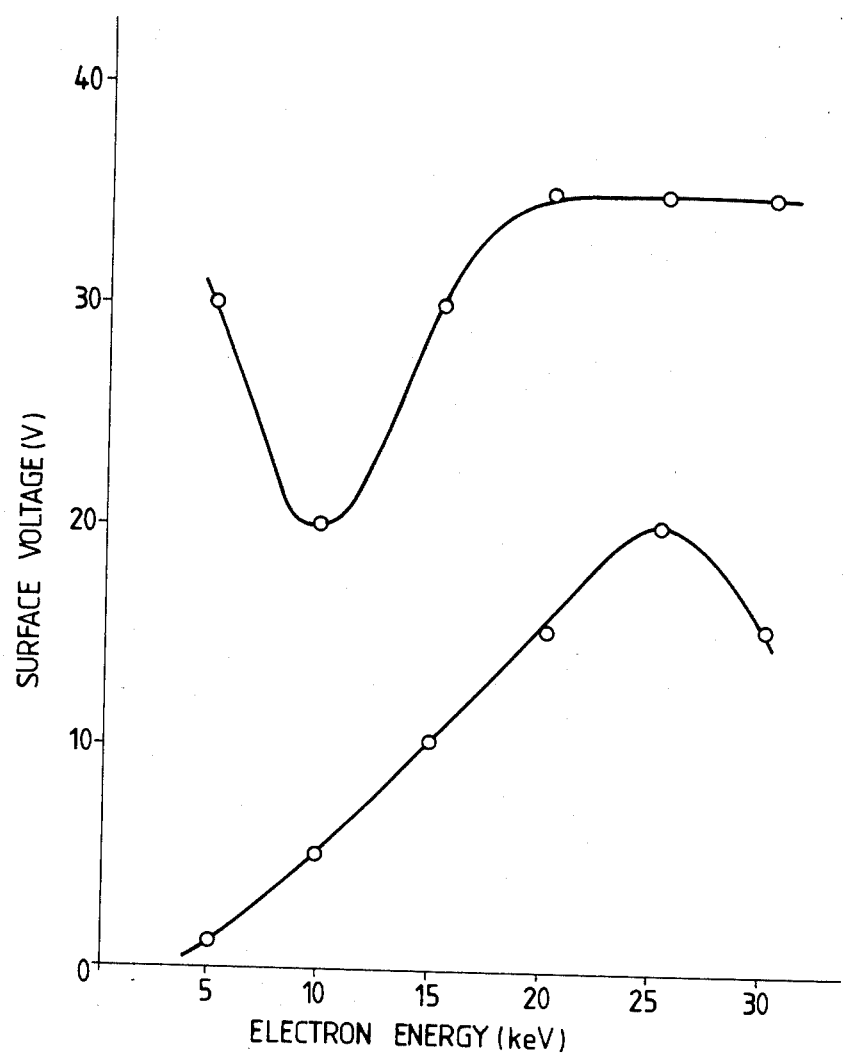
FIG. 2 shows graphically the variation of surface potential of two surface layers containing indium-oxide when irradiated by electrons having energies up to 30 keV.

The surface resistivity of the coated Rapton material is the parameter which determines the voltage acquired by the surface of the dielectric under electron irradiation. The data shown in FIG. 1 illustrate the scope for varying the value of this parameter for material of the type described in the present invention. Values less than about $10^7 \Omega$/square result in surface voltages below 500V, and the level falls progressively as the surface resistivity is reduced. FIG. 2 shows an example of the surface voltages attained by a coating having an indium oxide/polyimide ratio of 4:1 and a surface resistivity of $1\times10^5$ ohm/square, when it is irradiated with monoenergetic electrons having energies up to 30 keV.

The coated material described in this invention exhibits good flexibility as demonstrated by the fact that a sample having a loading of indium oxide/polyimide of 6:1 on 51 μm thick Kapton showed no change in surface resistivity until the radius of curvature of the film was reduced to 1 mm.

The coatings exhibited 100% adhesion to Kapton and this did not deteriorate during 1100 cycles between $+150°$ C. and $-150°$ C. in a nitrogen atmosphere. These tests were carried out on materials containing indium oxide and polyimide at ratios of 6:1 and 12:1. The same samples showed no significant changes in surface resistivity during the thermal cycling.

Figure 3A:
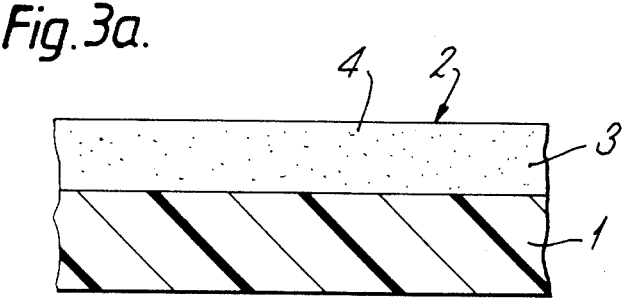
FIGS. 3a and 3b illustrate schematically the production of a body of dielectric material having a surface layer according to the invention.
Figure 3B:
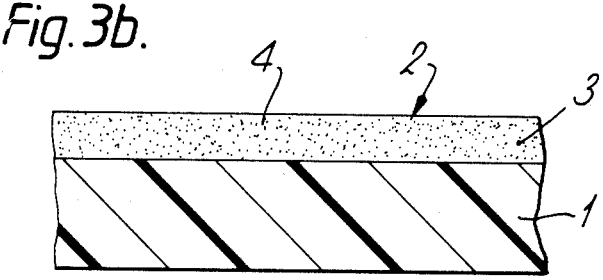

To produce a material according to the invention, it is necessary only to coat a substrate 1 of dielectric material with a layer 2 of the coating material of appropriate thickness, which can be determined empirically, and to evaporate the solvent to leave a totally solvent-free surface layer consisting of the metal oxide 3 dispersed in the polyimide 4 as shown in FIGS. 3a and 3b. The simplicity of this technique allows the substrate to be of complex shape, or even to be fabricated in situ.

We claim:

1. A dielectric material for use in a spacecraft, comprising a dielectric substrate having deposited on a surface thereof a semi-insulating layer consisting of a dispersion of a metal oxide in a polymer, the thickness of the surface layer being comparable to the expected maximum range of electrons to which the dielectric material will be exposed in use.

2. A dielectric material according to claim 1 wherein the surface layer has a thickness and metal oxide content such that the surface resistivity of the surface layer is less than $10^7$ Ω/square.

3. A dielectric material according to claim 1 wherein the metal oxide has a volume resistivity of less than 1 Ωm at the temperature and in the radiation field in which the dielectric material is to be employed.

4. A dielectric material according to claim 1 wherein the ratio by weight of the metal oxide to polymer in the surface layer extends to approximately twelve to one.

5. A dielectric material according to claim 1 wherein the thickness of the surface layer lies between one and one hundred micrometres.

6. A dielectric material according to claim 1 wherein the polymer is a polyimide.

7. A dielectric material according to claim 1 wherein the surface layer comprises indium oxide dispersed in a polyimide, the ratio by weight of indium oxide to polyimide having a value of up to twelve to one and having a thickness up to 5 μm.

8. A dielectric material as claimed in claim 1 wherein said dielectric substrate comprises an exposed surface of a spacecraft component.

9. A dielectric material according to claim 2 wherein the metal oxide has a volume resistivity of less than 1 Ωm at the temperature and in the radiation field in which the dielectric material is to be employed.

10. A dielectric material according to claim 3 wherein the metal oxide is selected from the group comprising indium oxide, indium-tin oxide, thallium oxide, zinc oxide and vanadium pentoxide.

11. A dielectric medium according to claim 10 wherein the surface layer comprises thallium oxide dispersed in a polyimide.

12. A dielectric material according to claim 4 wherein the ratio of metal oxide to polymer is about three to one.

13. A dielectric material according to claim 9 wherein the metal oxide is selected from the group comprising indium oxide, indium-tin oxide, thallium oxide, zinc oxide and vanadium pentoxide.

14. A dielectric medium according to claim 13 wherein the surface layer comprises thallium oxide dispersed in a polyimide.

15. A method of manufacturing a dielectric material for use in spacecraft, comprising the operation of coating a dielectric substrate with a surface layer comprising a metal oxide finely dispersed in a solvent solution of a polymer material of a thickness such that when the polymer solvent has evaporated the resultant surface layer is semi-insulating and has a thickness comparable with the expected maximum range of the incident electrons in use.

16. A method according to claim 15 wherein the polymer is a soluble polyimide and the solvent is a mixture of xylene and acetophenone.

17. A method as claimed in claim 15 wherein said dielectric substrate comprises an exposed surface of a spacecraft component.

18. A method according to claim 15 wherein the metal oxide is selected to have a volume resistivity less than 1 Ωm at the temperature and in the radiation field in which the dielectric material is to be employed.

19. A method according to claim 18 wherein the metal oxide is selected from the group comprising indium oxide, indium-tin oxide, thallium oxide, zinc oxide and vanadium pentoxide.

* * * * *